March 14, 1939. L. J. WRIGHT 2,150,477
REEL FOR FISHLINES
Filed Aug. 9, 1938
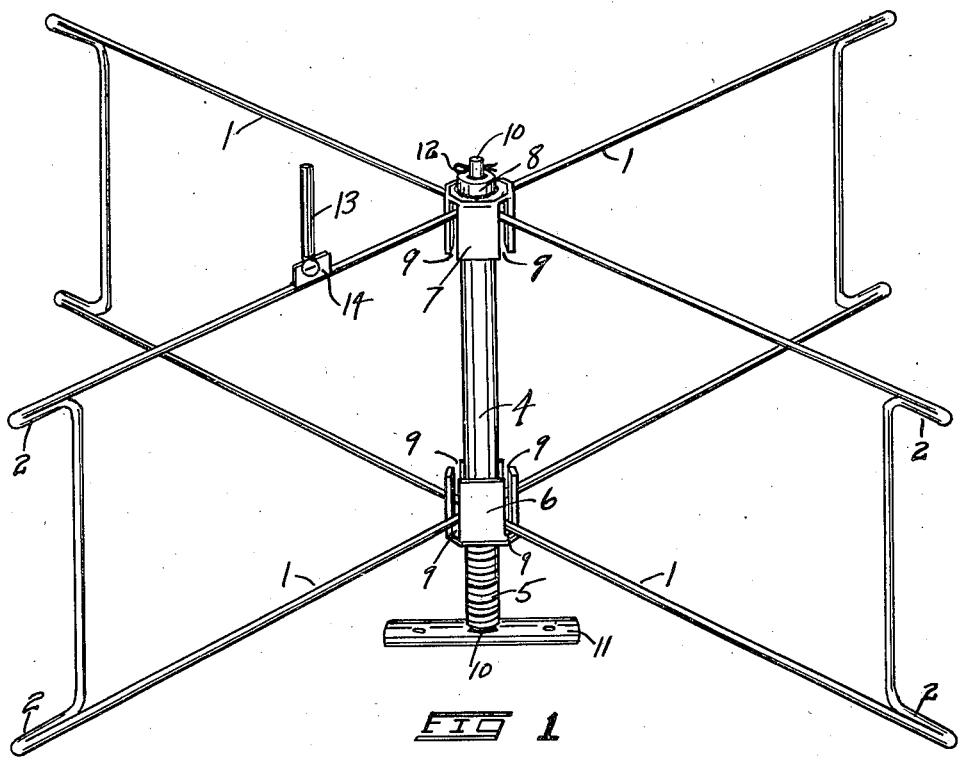
FIG 1
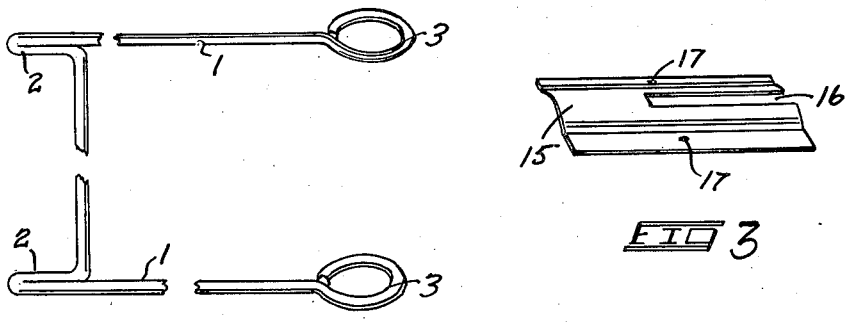
FIG 2
FIG 3
Leon J. Wright
INVENTOR.
BY W. B. Harpman
ATTORNEY.

Patented Mar. 14, 1939

2,150,477

UNITED STATES PATENT OFFICE 2,150,477

REEL FOR FISHLINES

Leon J. Wright, Akron, Ohio

Application August 9, 1938, Serial No. 223,844

3 Claims. (Cl. 242—115)

This invention relates to a reel for drying fish line.

The principal object of this invention is the provision of a reel adapted for use in drying fish lines and one which may be folded compactly when not in use.

A further object of this invention is the provision of a reel formed of a plurality of arm sections each of which pivots upon the hub of the reel and are normally held in open position by means of slotted brackets attached to the hub of the reel.

A still further object of this invention is the provision of a reel the foot of which is so formed as to be easily attached to a normal reel clamp upon a fish pole or which may be positioned in a slotted plate which has been affixed to a building, thus providing several ways of positioning the reel for use.

The reel shown and described herein has been designed to form an efficient and convenient means of drying the fish line. With the object of providing a reel that may be readily carried from place to place, a practical means of folding the reel has been devised, and at the same time a reel has been provided which in open position forms a firm and practical article. A convenient folding handle has been provided and is attached to one of the arms of the reel.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:

Figure 1 is perspective view of the reel showing the device in an open usable form.

Figure 2 is a perspective view with parts broken away showing the formation of one of the arms of the reel.

Figure 3 is a perspective view of a slotted plate which may be attached to a building and which will serve as a means of mounting the reel thereon.

By referring to the drawing and Figure 1 in particular it will be seen that the reel comprises a plurality of arms 1 each of which is preferably formed of a continuous length of wire so shaped as to form a pair of guides 2 at the outer ends of the arms 1.

By referring to Figure 2 it will be seen that the inner ends of the arms 1 have been formed into loops 3 which are adapted to encircle loosely the hub 4 of the reel which is preferably formed of a section of metal tube, the lower end 5 of which is threaded and adapted to receive thereon a threaded slotted bracket 6, which in turn with a similar slotted bracket 7 oppositely disposed at the upper end of the hub 4 serve to hold and position the plurality of arms 1 about the hub 4. The slotted bracket 7 preferably is welded or otherwise affixed to the upper end 8 of the hub 4. It will be seen that each of the slotted brackets 6 and 7 provides a plurality of slotted openings 9 which serve to receive the arms 1.

It will be obvious that the loops 3 formed on the arms 1 at the inner ends will be positioned one above the other around the hub 4. In order that the reel may be revolved a rod 10 has been positioned through the hub 4. A slightly rounded and arched foot 11 is welded to the lower end of the rod 10 and a cotter pin 12 has been positioned in an opening in the top thus positioning the reel upon the rod 10. A handle 13 is pivoted to a bracket 14 which is in turn welded to one of the arms 1. In order that the reel may be conveniently positioned upon a building or other structure an arched plate 15 has been provided which has a slot 16 formed therein together with a pair of openings 17 which may serve as convenient nail holes. This arched plate 15 is adapted to receive the rod 10 in the slot 16 thereof and will serve to hold the reel securely.

In folding the reel it is only necessary to squeeze the arms together until the inner ends thereof have slid along the hub 4 and passed out of the slots 9, when this occurs the various arms 1 may be turned around the hub 4 until they are all adjacent to one another at which time the inner ends may all engage a pair of oppositely disposed slots 9 and thus remain in folded position.

It will be seen that in placing a fish line upon the opened reel it is only necessary to pull the end of the line into the abutting portions of one of the guides 2 which will serve as a clamp and hold the end of the line firmly while it is wound upon the reel.

What I claim is:

1. A reel comprising a hub, a plurality of U-shaped arms, looped ends on the said arms adapted to slidably engage the said hub, slotted brackets on the said hub adapted to receive the said arms and position them about the hub so as to form a reel.

2. A reel comprising a hub, a plurality of U-shaped arms formed of wire, looped inner ends on the said arms adapted to slidably encircle the hub, slotted brackets on the said hub adapted to receive and retain the said arms in position about the hub, a pivot pin in the said hub, and a foot on the said pivot pin.

3. A reel comprising a hub, and a plurality of U-shaped arms, guide portions formed at the outer end of the said arms, looped ends formed on the said arms adapted to slidably encircle the hub, a pin passing through the said hub, a foot formed on the said pin, oppositely disposed slotted brackets positioned on the ends of the said hub and adapted to receive the said arms and hold them in position about the hub so as to form a reel.

LEON J. WRIGHT.